United States Patent
Yao

(10) Patent No.: US 9,448,611 B2
(45) Date of Patent: Sep. 20, 2016

(54) INTERFACE EXPENDING METHOD AND DEVICE FOR TABLET COMPUTER

(71) Applicant: ZTE Corporation, Shenzhen, Guangdong (CN)

(72) Inventor: Xiaopeng Yao, Shenzhen (CN)

(73) Assignee: ZTE CORPORATION, Shenzhen, Guangdon (CN)

( * ) Notice: Subject to any disclaimer, the term of this patent is extended or adjusted under 35 U.S.C. 154(b) by 0 days.

(21) Appl. No.: 14/421,113

(22) PCT Filed: Jul. 17, 2013

(86) PCT No.: PCT/CN2013/079521
§ 371 (c)(1),
(2) Date: Feb. 11, 2015

(87) PCT Pub. No.: WO2013/178146
PCT Pub. Date: Dec. 5, 2013

(65) Prior Publication Data
US 2015/0234445 A1    Aug. 20, 2015

(30) Foreign Application Priority Data
Aug. 30, 2012   (CN) .......................... 2012 1 0315236

(51) Int. Cl.
G06F 1/32      (2006.01)
G06F 11/30     (2006.01)

(52) U.S. Cl.
CPC ......... *G06F 1/3262* (2013.01); *G06F 11/3027* (2013.01); *G06F 11/3051* (2013.01)

(58) Field of Classification Search
CPC ............... G06F 13/387; G06F 1/3262; G06F 11/3051; G06F 11/3027
USPC ............................................ 710/14–19, 305
See application file for complete search history.

(56) References Cited

U.S. PATENT DOCUMENTS 8,145,800 B2 *   3/2012  Levin ................... G06F 13/385
                                                   320/112
9,201,827 B2 *  12/2015  Lydon .................. G06F 13/385
(Continued)

FOREIGN PATENT DOCUMENTS

CN   1441350 A    9/2003
CN   1747253 A    3/2006
(Continued)

OTHER PUBLICATIONS

Supplementary European Search Report in European application No. 13796507.5, mailed on Oct. 12, 2015.
(Continued)

Primary Examiner — Tammara Peyton
(74) Attorney, Agent, or Firm — Oppedahl Patent Law Firm LLC

(57) ABSTRACT

Provided are an interface expanding method and device. It is detected whether there is a voltage input at a power supply pin of the interface, an impedance between a signal indication pin of the interface and a ground pin of the interface is detected when no voltage input is detected, and a type of a cable inserted into the interface is determined according to the detected impedance; it is detected whether there is a short circuit or an open circuit between a data signal positive pin of the interface and a data signal minus pin of the interface when the voltage input is detected, and the type of the cable inserted into the interface is determined according to the detected result; and a relevant component in the tablet computer is controlled, according to the determined type of the calle inserted into the interface, to operate correspondingly.

8 Claims, 2 Drawing Sheets

(56) References Cited

U.S. PATENT DOCUMENTS

| | | |
|---|---|---|
| 2009/0109639 A1 | 4/2009 | Li |
| 2009/0182935 A1 | 7/2009 | Pizzarulli |
| 2010/0168653 A1 | 7/2010 | Levin |
| 2011/0055407 A1 | 3/2011 | Lydon |
| 2012/0185619 A1 | 7/2012 | Levin |
| 2014/0075054 A1 | 3/2014 | Lydon et al. |

FOREIGN PATENT DOCUMENTS

| | | |
|---|---|---|
| CN | 101246465 A | 8/2008 |
| CN | 101426038 A | 5/2009 |
| CN | 201289641 Y | 8/2009 |
| CN | 201945991 U | 8/2011 |
| CN | 102393837 A | 3/2012 |
| CN | 102622314 A | 8/2012 |
| CN | 102880238 A | 1/2013 |
| GB | 2473123 A | 3/2011 |

OTHER PUBLICATIONS

International Search Report in international application No. PCT/CN2013/079521, mailed on Oct. 24, 2013.

English Translation of the Written Opinion of the International Search Authority in international application No. PCT/CN2013/079521, mailed on Oct. 24, 2013.

\* cited by examiner

INTERFACE EXPENDING METHOD AND DEVICE FOR TABLET COMPUTER

TECHNICAL FIELD

The disclosure relates to tablet computer techniques, and in particular to an interface expanding method and device for a tablet computer.

BACKGROUND

At present, form of tablet computers, and particularly their interface design, have become increasingly simple. For a tablet computer, data communication interface, charging interface, audio/video interface or even interface for vehicular equipments are integrated into one single physical interface, which is typically a micro Universal Serial Bus (USB) interface or a mini USB interface. However, at present, various types of cables including an adapter charging cable, a USB charging cable, an A-type USB cable, a B-type USB cable, an audio cable, a video cable or a cable for vehicular equipments, can be connected to the micro USB or mini USB interface of the tablet computer, only when an external expanding equipment, such as an expanding slot or an expanding base, is connected to the micro USB or mini USB interface. However, this not only increases user expenditure, but also results in great inconvenience due to the fact that when a user takes a tablet computer out, he/she has to carry the expanding equipment.

SUMMARY

In view of the above, the embodiments of the disclosure provide an interface expanding method and device for a tablet computer, which make it possible to connect various types of cables to a micro USB interface or a mini USB interface without an external expanding equipment, thereby avoiding a user from carrying the expanding equipment.

The embodiments of the disclosure are described as follows.

An embodiment of the disclosure provides an interface expanding device for a tablet computer, which is built in the tablet computer, and the device includes an interface, a voltage detection unit, an impedance detection unit, a charging detection unit and a central processing unit, wherein the interface is configured to allow a cable to be inserted thereinto;

wherein the voltage detection unit is configured to detect whether there is a voltage input at a power supply (VBUS) pin of the interface, notify the impedance detection unit when no voltage input is detected, and notify the charging detection unit when the voltage input is detected;

wherein the impedance detection unit is configured to, after receiving the notification from the voltage detection unit, detect an impedance between a signal indication (ID) pin of the interface and a ground (GND) pin of the interface;

wherein the charging detection unit is configured to, after receiving the notification from the voltage detection unit, detect whether there is a short circuit or an open circuit between a data signal positive (DP) pin of the interface and a data signal minus (DM) pin of the interface; and wherein the central processing unit is configured to, according to the impedance detected by the impedance detection unit or a detection result from the charging detection unit, determine a type of a cable inserted into the interface, and control, according to the determined type of the cable inserted into the interface, a relevant component in the tablet computer to operate correspondingly.

In an embodiment, the central processing unit may be configured to, according to the impedance detected by the impedance detection unit, determine the type of the cable inserted into the interface through querying correspondences between preset impedances and cable types.

In an embodiment, the central processing unit may be configured to: when the impedance detected by the impedance detection unit is 0 ohm, determine that the cable inserted into the interface is an A-type Universal Serial Bus (USB) cable through querying the correspondences between preset impedances and cable types;

when the impedance detected by the impedance detection unit is larger than or equal to 34.6 kilo-ohms and smaller than or equal to 36.8 kilo-ohms, determine that the cable inserted into the interface is a video cable through querying the correspondences between preset impedances and cable types;

when the impedance detected by the impedance detection unit is larger than or equal to 64.6 kilo-ohms and smaller than or equal to 71.4 kilo-ohms, determine that the cable inserted into the interface is an audio cable through querying the correspondences between preset impedances and cable types;

when the impedance detected by the impedance detection unit is larger than or equal to 198 kilo-ohms and smaller than or equal to 202 kilo-ohms, determine that the cable inserted into the interface is a cable for vehicular equipments through querying the correspondences between preset impedances and cable types; and when the impedance detected by the impedance detection unit is infinite, determine that the cable inserted into the interface is a B-type USB cable through querying the correspondences between preset impedances and cable types.

In an embodiment, the charging detection unit may be configured to, after receiving the notification from the voltage detection unit, detect whether there is a short circuit or an open circuit between the DP pin and the DM pin, transmit a low level signal to the central processing unit when a short circuit is detected, and transmit a high level signal to the central processing unit when an open circuit is detected; and wherein the central processing unit may be further configured to, when receiving the low level signal, determine that the cable inserted into the interface is an adapter charging cable according to correspondences between signal levels and cable types, and when receiving the high level signal, determine that the cable inserted into the interface is a USB charging cable according to the correspondences between signal levels and cable types.

In an embodiment, the device may further include an interface selection unit, a power supply unit and a charging management unit, wherein the central processing unit comprises a master equipment interface, a video function interface, an audio function interface and a slave equipment interface, and wherein the central processing unit is configured to: when determining that the cable inserted into the interface is the A-type USB cable, enable the master equipment interface, control the interface selection unit to connect the master equipment interface with an interface of a slave equipment connected to the A-type USB cable, and control the power supply unit to supply power to the slave equipment via the VBUS pin;

when determining that the cable inserted into the interface is the video cable, enable the video function interface, and control the interface selection unit to connect the video function interface with an interface of an equipment connected to the video cable;

when determining that the cable inserted into the interface is the audio cable, enable the audio function interface, and control the interface selection unit to connect the audio function interface with an interface of an equipment connected to the audio cable;

when determining that the cable inserted into the interface is the cable for vehicular equipments, enable the audio function interface or the video function interface, and control the interface selection unit to connect the audio function interface or the video function interface with an interface of an equipment connected to the cable for vehicular equipments;

when determining that the cable inserted into the interface is the B-type USB cable, enable the slave equipment interface, and control the interface selection unit to connect the slave equipment interface with an interface of a master equipment connected to the B-type USB cable;

when determining that the cable inserted into the interface is the adapter charging cable, control the charging management unit to charge with a rated adapter charging current; and when determining that the cable inserted into the interface is the USB charging cable, control the charging management unit to charge with a rated USB charging current.

An embodiment of the disclosure provides an interface expanding method for a tablet computer, and the method includes:

it is detected whether there is a voltage input at a power supply (VBUS) pin of the interface, an impedance between a signal indication (ID) pin of the interface and a ground (GND) pin of the interface is detected when no voltage input is detected, and a type of a cable inserted into the interface is determined according to the detected impedance;

it is detected whether there is a short circuit or an open circuit between a data signal positive (DP) pin of the interface and a data signal minus (DM) pin of the interface when the voltage input is detected, and the type of the cable inserted into the interface is determined according to the detected result; and a relevant component in the tablet computer is controlled, according to the determined type of the cable inserted into the interface, to operate correspondingly.

In an embodiment, the step that a type of a cable inserted into the interface is determined according to the detected impedance may include:

the type of the cable inserted into the interface is determined, according to the detected impedance, through querying correspondences between preset impedances and cable types.

In an embodiment, the step that the type of the cable inserted into the interface is determined, according to the detected impedance, through querying correspondences between preset impedances and cable types may include:

when the detected impedance is 0 ohm, it is determined that the cable inserted into the interface is an A-type Universal Serial Bus (USB) cable through querying the correspondences between preset impedances and cable types;

when the detected impedance is larger than or equal to 34.6 kilo-ohms and smaller than or equal to 36.8 kilo-ohms, it is determined that the cable inserted into the interface is a video cable through querying the correspondences between preset impedances and cable types;

when the detected impedance is larger than or equal to 64.6 kilo-ohms and smaller than or equal to 71.4 kilo-ohms, it is determined that the cable inserted into the interface is an audio cable through querying the correspondences between preset impedances and cable types;

when the detected impedance is larger than or equal to 198 kilo-ohms and smaller than or equal to 202 kilo-ohms, it is determined that the cable inserted into the interface is a cable for vehicular equipments through querying the correspondences between preset impedances and cable types;

when the detected impedance is infinite, it is determined that the cable inserted into the interface is a B-type USB cable through querying the correspondences between preset impedances and cable types.

In an embodiment, the detecting whether there is a short circuit or an open circuit between a DP pin of the interface and a DM pin of the interface when the voltage input is detected, and the determining, according to the detected result, the type of the cable inserted into the interface may include:

it is detected whether there is a short circuit or an open circuit between the DP pin and the DM pin, a low level signal is transmitted when a short circuit is detected, and a high level signal is transmitted when an open circuit is detected; and when the low level signal is received, it is determined that the cable inserted into the interface is an adapter charging cable according to the correspondences between signal levels and cable types, and when the high level signal is detected, it is determined that the cable inserted into the interface is a USB charging cable according to the correspondences between signal levels and cable types.

In an embodiment, the step that a relevant component in the tablet computer is controlled, according to the determined type of the cable inserted into the interface, to operate correspondingly may include:

when it is determined that the cable inserted into the interface is the A-type USB cable, a master equipment interface is enabled, an interface selection unit is controlled to connect the master equipment interface with an interface of a slave equipment connected to the A-type USB cable, and a power supply unit is controlled to supply power to the slave equipment via the VBUS pin;

when it is determined that the cable inserted into the interface is the video cable, a video function interface is enabled, and the interface selection unit is controlled to connect the video function interface with an interface of an equipment connected to the video cable;

when it is determined that the cable inserted into the interface is the audio cable, an audio function interface is enabled, and the interface selection unit is controlled to connect the audio function interface with an interface of an equipment connected to the audio cable;

when it is determined that the cable inserted into the interface is the cable for vehicular equipments, the audio function interface or the video function interface is enabled, and the interface selection unit is controlled to connect the audio function interface or the video function interface with an interface of an equipment connected to the cable for vehicular equipments;

when it is determined that the cable inserted into the interface is the B-type USB cable, a slave equipment interface is enabled, and the interface selection unit is controlled to connect the slave equipment interface with an interface of a master equipment connected to the B-type USB cable;

when it is determined that the cable inserted into the interface is the adapter charging cable, a charging management unit is controlled to charge with a rated adapter charging current; and when it is determined that the cable inserted into the interface is the USB charging cable, the charging management unit is controlled to charge with a rated USB charging current.

According to embodiment of the disclosure, it is detected whether there is a voltage input at a power supply (VBUS) pin of the interface, an impedance between a signal indication (ID) pin of the interface and a ground (GND) pin of the interface is detected when no voltage input is detected, and a type of a cable inserted into the interface is determined according to the detected impedance; it is detected whether there is a short circuit or an open circuit between a data signal positive (DP) pin of the interface and a data signal minus (DM) pin of the interface when the voltage input is detected, and the type of the cable inserted into the interface is determined according to the detected result; and a relevant component in the tablet computer is controlled, according to the determined type of the cable inserted into the interface, to operate correspondingly. In this way, the interface expanding device for a tablet computer according to the embodiment of the disclosure can be built in the tablet computer, and the device can determine the type of the cable inserted into the interface according to the detected impedance or the detected open or short circuit between the DP pin of the interface and the DM pin of the interface, and performs subsequent control. Accordingly, various types of cables can be connected to a micro USB or a mini USB without an external expanding equipment.

DETAILED DESCRIPTION

Figure 1:
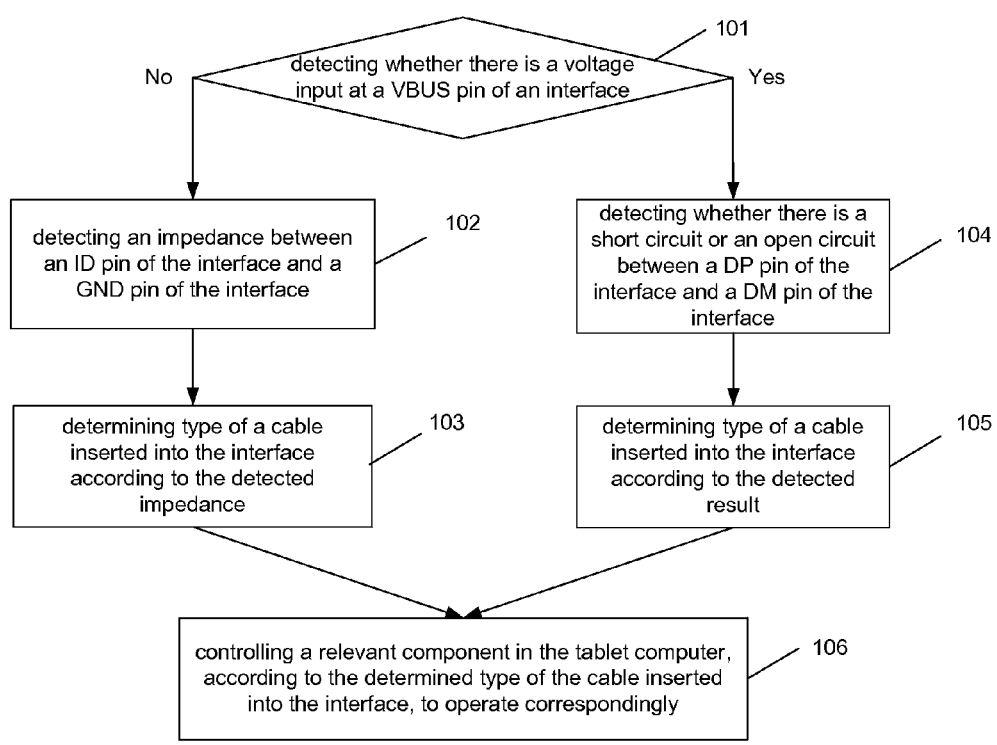
FIG. 1 is a flow chart of an interface expanding method for a tablet computer according to an embodiment of the disclosure.

As shown in FIG. 1, an embodiment of the disclosure provides an interface expanding method for a tablet computer, which includes:

step 101, it is detected whether there is a voltage input at a power supply (VBUS) pin of the interface; when no voltage input is detected, proceed to step 102; and when the voltage input is detected, proceed to step 104;

step 102, an impedance between a signal indication (ID) pin of the interface and a ground (GND) pin of the interface is detected;

step 103, a type of a cable inserted into the interface is determined according to the detected impedance, then proceed to step 106;

step 104, it is detected whether there is a short circuit or an open circuit between a data signal positive (DP) pin of the interface and a data signal minus (DM) pin of the interface;

step 105, a type of a cable inserted into the interface is determined according to the detected result; and step 106, a relevant component in the tablet computer is controlled, according to the determined type of the cable inserted into the interface, to operate correspondingly.

Preferably, step 103 may include: the type of the cable inserted into the interface is determined, according to the detected impedance, through querying correspondences between preset impedances and cable types; specifically, when the detected impedance is 0 ohm, it is determined that the cable inserted into the interface is an A-type USB cable through querying the correspondences between preset impedances and cable types;

when the detected impedance is larger than or equal to 34.6 kilo-ohms and smaller than or equal to 36.8 kilo-ohms, it is determined that the cable inserted into the interface is a video cable through querying the correspondences between preset impedances and cable types;

when the detected impedance is larger than or equal to 64.6 kilo-ohms and smaller than or equal to 71.4 kilo-ohms, it is determined that the cable inserted into the interface is an audio cable through querying the correspondences between preset impedances and cable types;

when the detected impedance is larger than or equal to 198 kilo-ohms and smaller than or equal to 202 kilo-ohms, it is determined that the cable inserted into the interface is a cable for vehicular equipments through querying the correspondences between preset impedances and cable types; and when the detected impedance is infinite, it is determined that the cable inserted into the interface is a B-type USB cable through querying the correspondences between preset impedances and cable types.

The correspondences between preset impedances and cable types can be set empirically.

Preferably, steps 104 and 105 may include:

it is detected whether there is a short circuit or an open circuit between the DP pin and the DM pin, a low level signal is issued when a short circuit is detected, and a high level signal is issued when an open circuit is detected; and when the low level signal is received, it is determined that the cable inserted into the interface is an adapter charging cable according to the correspondences between signal levels and cable types, and when the high level signal is received, it is determined that the cable inserted into the interface is a USB charging cable according to the correspondences between signal levels and cable types.

In practical applications, when a short circuit is detected between the DP pin and the DM pin, a high level signal can be issued, and when an open circuit is detected between the DP pin and the DM pin, a low level signal can be issued, then the correspondences between signal levels and cable types may include: the high level signal corresponds to the adapter charging cable, and the low level signal corresponds to the USB charging cable.

Preferably, steps 106 may include:

when it is determined that the cable inserted into the interface is the A-type USB cable, a master equipment interface is enabled, an interface selection unit is controlled to connect the master equipment interface with an interface of a slave equipment connected to the A-type USB cable, and a power supply unit is controlled to supply power to the slave equipment via the VBUS pin;

when it is determined that the cable inserted into the interface is the video cable, a video function interface is enabled, and the interface selection unit is controlled to connect the video function interface with an interface of an equipment connected to the video cable;

when it is determined that the cable inserted into the interface is the audio cable, an audio function interface is enabled, and the interface selection unit is controlled to connect the audio function interface with an interface of an equipment connected to the audio cable;

when it is determined that the cable inserted into the interface is the cable for vehicular equipments, the audio function interface or the video function interface is enabled, and the interface selection unit is controlled to connect the audio function interface or the video function interface with an interface of an equipment connected to the cable for vehicular equipments;

when it is determined that the cable inserted into the interface is the B-type USB cable, a slave equipment interface is enabled, and the interface selection unit is controlled to connect the slave equipment interface with an interface of a master equipment connected to the B-type USB cable;

when it is determined that the cable inserted into the interface is the adapter charging cable, a charging management unit is controlled to charge with a rated adapter charging current; and when it is determined that the cable inserted into the interface is the USB charging cable, the charging management unit is controlled to charge with a rated USB charging current.

Preferably, the interface may be a micro USB interface or a mini USB interface.

Figure 2:
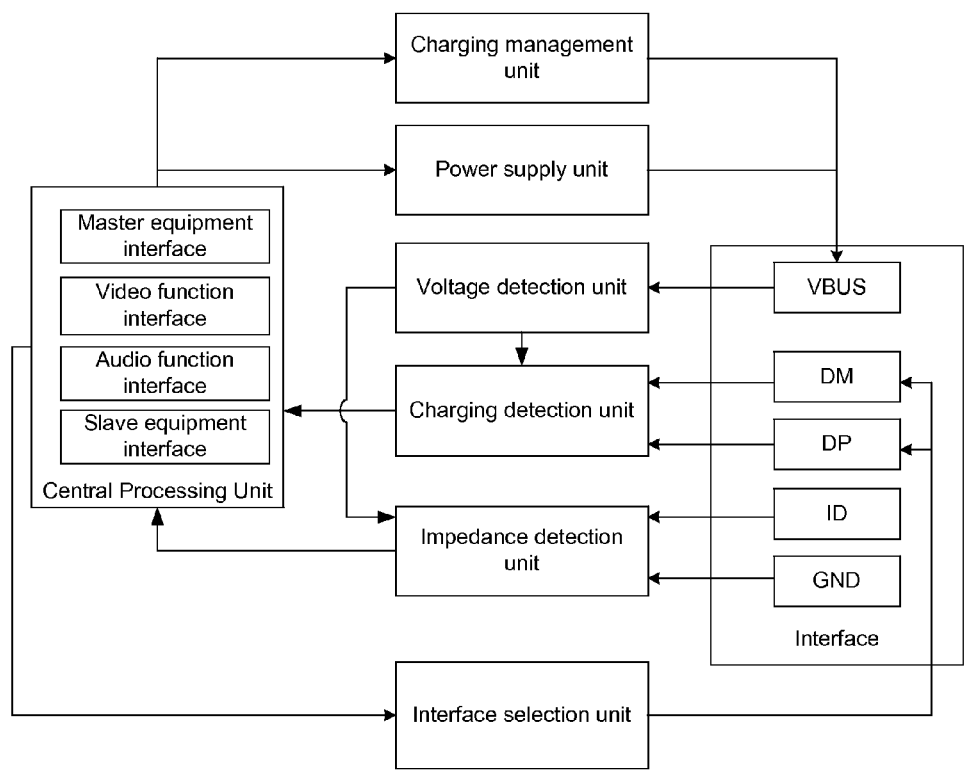
FIG. 2 is a schematic structural diagram of an interface expanding device for a tablet computer according to an embodiment of the disclosure.

An interface expanding device for a tablet computer provided by an embodiment of the disclosure, which is built in the tablet computer, is as shown in FIG. 2, and the device includes an interface, a voltage detection unit, an impedance detection unit, a charging detection unit and a central processing unit, wherein the interface is configured to allow a cable to be inserted thereinto;

wherein the voltage detection unit is configured to detect whether there is a voltage input at a power supply (VBUS) pin of the interface, notify the impedance detection unit when no voltage input is detected, and notify the charging detection unit when the voltage input is detected;

wherein the impedance detection unit is configured to, after receiving the notification from the voltage detection unit, detect an impedance between a signal indication (ID) pin of the interface and a ground (GND) pin of the interface;

wherein the charging detection unit is configured to, after receiving the notification from the voltage detection unit, detect whether there is a short circuit or an open circuit between a data signal positive (DP) pin of the interface and a data signal minus (DM) pin of the interface; and wherein the central processing unit is configured to, according to the impedance detected by the impedance detection unit or a detection result from the charging detection unit, determine a type of a cable inserted into the interface, and control, according to the determined type of the cable inserted into the interface, a relevant component in the tablet computer to operate correspondingly.

Preferably, the central processing unit may be configured to, according to the impedance detected by the impedance detection unit, determine the type of the cable inserted into the interface through querying correspondences between preset impedances and cable types.

Preferably, the central processing unit may be configured to: when the impedance detected by the impedance detection unit is 0 ohm, determine that the cable inserted into the interface is an A-type USB cable through querying the correspondences between preset impedances and cable types;

when the impedance detected by the impedance detection unit is larger than or equal to 34.6 kilo-ohms and smaller than or equal to 36.8 kilo-ohms, determine that the cable inserted into the interface is a video cable through querying the correspondences between preset impedances and cable types;

when the impedance detected by the impedance detection unit is larger than or equal to 64.6 kilo-ohms and smaller than or equal to 71.4 kilo-ohms, determine that the cable inserted into the interface is an audio cable through querying the correspondences between preset impedances and cable types;

when the impedance detected by the impedance detection unit is larger than or equal to 198 kilo-ohms and smaller than or equal to 202 kilo-ohms, determine that the cable inserted into the interface is a cable for vehicular equipments through querying the correspondences between preset impedances and cable types; and when the impedance detected by the impedance detection unit is infinite, determine that the cable inserted into the interface is a B-type USB cable through querying the correspondences between preset impedances and cable types.

Preferably, the charging detection unit may be configured to, after receiving the notification from the voltage detection unit, detect whether there is a short circuit or an open circuit between the DP pin and the DM pin, transmit a low level signal to the central processing unit when a short circuit is detected, and transmit a high level signal to the central processing unit when an open circuit is detected; and the central processing unit may be further configured to, when receiving the low level signal, determine that the cable inserted into the interface is an adapter charging cable according to correspondences between signal levels and cable types, and when receiving the high level signal, determine that the cable inserted into the interface is a USB charging cable according to the correspondences between signal levels and cable types.

Preferably, the device may further include an interface selection unit, a power supply unit and a charging management unit, wherein the central processing unit comprises a master equipment interface, a video function interface, an audio function interface and a slave equipment interface, and wherein the central processing unit may be configured to: when determining that the cable inserted into the interface is the A-type USB cable, enable the master equipment interface, control the interface selection unit to connect the master equipment interface with an interface of a slave equipment connected to the A-type USB cable, and control the power supply unit to supply power to the slave equipment via the VBUS pin;

when determining that the cable inserted into the interface is the video cable, enable the video function interface, and control the interface selection unit to connect the video function interface with an interface of an equipment connected to the video cable;

when determining that the cable inserted into the interface is the audio cable, enable the audio function interface, and control the interface selection unit to connect the audio function interface with an interface of an equipment connected to the audio cable;

when determining that the cable inserted into the interface is the cable for vehicular equipments, enable the audio function interface or the video function interface, and control the interface selection unit to connect the audio function interface or the video function interface with an interface of an equipment connected to the cable for vehicular equipments;

when determining that the cable inserted into the interface is the B-type USB cable, enable the slave equipment interface, and control the interface selection unit to connect the slave equipment interface with an interface of a master equipment connected to the B-type USB cable;

when determining that the cable inserted into the interface is the adapter charging cable, control the charging management unit to charge with a rated adapter charging current; and when determining that the cable inserted into the interface is the USB charging cable, control the charging management unit to charge with a rated USB charging current.

Preferably, the interface may be a micro USB interface or a mini USB interface.

The operation of the interface expanding device for a tablet computer according to the embodiment of the disclosure will be described below, and the operation process of the device includes:

step 301, the voltage detection unit detects whether there is a voltage input at a power VBUS pin of the interface, notifies the impedance detection unit when no voltage input is detected, and notifies the charging detection unit when the voltage input is detected;

step 302, after receiving the notification from the voltage detection unit, the impedance detection unit detects an impedance between an ID pin of the interface and a GND pin of the interface;

step 303, the central processing unit determines a type of a cable inserted into the interface through querying correspondences between preset impedances and cable types, according to the impedance detected by the impedance detection unit;

specifically, when the impedance detected by the impedance detection unit is 0 ohm, the central processing unit determines that the cable inserted into the interface is an A-type USB cable through querying the correspondences between preset impedances and cable types; when the cable inserted into the interface is the A-type USB cable, a tablet computer connected to the A-type USB cable is taken as a master equipment, other equipments connected to the A-type USB cable are taken as slave equipments, and the other equipments may be equipments such as a USB flash disk, a mouse, a keyboard and the like.

when the impedance detected by the impedance detection unit is larger than or equal to 34.6 kilo-ohms and smaller than or equal to 36.8 kilo-ohms, the central processing unit determines that the cable inserted into the interface is a video cable through querying the correspondences between preset impedances and cable types;

when the impedance detected by the impedance detection unit is larger than or equal to 64.6 kilo-ohms and smaller than or equal to 71.4 kilo-ohms, the central processing unit determines that the cable inserted into the interface is an audio cable through querying the correspondences between preset impedances and cable types;

when the impedance detected by the impedance detection unit is larger than or equal to 198 kilo-ohms and smaller than or equal to 202 kilo-ohms, the central processing unit determines that the cable inserted into the interface is a cable for vehicular equipments through querying the correspondences between preset impedances and cable types; and specifically, when the impedance detected by the impedance detection unit is infinite, the central processing unit determines that the cable inserted into the interface is a B-type USB cable through querying the correspondences between preset impedances and cable types; when the cable inserted into the interface is the B-type USB cable, a tablet computer connected to the B-type USB cable is taken as a slave equipment, other equipments connected to the B-type USB cable are taken as master equipments, and then the tablet computer can serve as a storage for other equipments to call.

step 304, after receiving the notification from the voltage detection unit, the charging detection unit detects whether there is a short circuit or an open circuit between the DP pin and the DM pin, transmits a low level signal to the central processing unit when a short circuit is detected, and transmits a high level signal to the central processing unit when an open circuit is detected;

step 305, the central processing unit determines the type of the cable inserted into the interface according to the detected result;

specifically, when receiving the low level signal, the central processing unit determines that the cable inserted into the interface is an adapter charging cable according to the correspondences between signal levels and cable types, and when receiving the high level signal, the central processing unit determines that the cable inserted into the interface is a USB charging cable according to the correspondences between signal levels and cable types.

step 306, the central processing unit controls, according to the determined type of the cable inserted into the interface, a relevant component in the tablet computer to operate correspondingly.

Specifically, when determining that the cable inserted into the interface is the A-type USB cable, the central processing unit enables the master equipment interface therein, controls the interface selection unit to connect the master equipment interface with an interface of a slave equipment (e.g., a USB flash driver) connected to the A-type USB cable, so that the tablet computer can acquire data from the slave equipment, and controls the power supply unit to supply power to the slave equipment via the VBUS pin;

when determining that the cable inserted into the interface is the video cable, the central processing unit enables the video function interface therein, and controls the interface selection unit to connect the video function interface with an interface of an equipment (e.g., a TV set) connected to the video cable, so that the tablet computer can output video data to the equipment;

when determining that the cable inserted into the interface is the audio cable, the central processing unit enables the audio function interface therein, and controls the interface selection unit to connect the audio function interface with an interface of an equipment (e.g., a stereo equipment) connected to the audio cable, so that the tablet computer can output audio data to the equipment;

when determining that the cable inserted into the interface is the cable for vehicular equipments, the central processing unit enables the audio function interface or the video function interface therein, and controls the interface selection unit to connect the audio function interface or the video function interface with an interface of an equipment connected to the cable for vehicular equipments, so that the tablet computer can output audio data or video data to the equipment;

when determining that the cable inserted into the interface is the B-type USB cable, the central processing unit enables the slave equipment interface therein, and controls the interface selection unit to connect the slave equipment interface with an interface of a master equipment (e.g., a computer) connected to the B-type USB cable, so that the tablet computer can provides the master equipment with data;

when determining that the cable inserted into the interface is the adapter charging cable, the central processing unit controls the charging management unit to charge with a rated adapter charging current, for example, 1.5 A; and when it is determined that the cable inserted into the interface is the USB charging cable, the central processing unit controls the charging management unit to charge with a rated USB charging current, for example, 500 mA.

To sum up, the interface expanding device for a tablet computer according to the embodiment of the disclosure can be built in the tablet computer, and the device determines, according to the detected impedance or the detected open circuit or short circuit between the DP pin of the interface and the DM pin of the interface, the type of the cable inserted into the interface and performs subsequent controls, so that various types of cables can be connected to a micro USB or a mini USB without an external expanding equipment.

What are described above are merely preferable embodiments of the disclosure, and are not intended to limit the scope of the disclosure.

The invention claimed is:

1. An interface expanding device for a tablet computer, which is built in the tablet computer, the device comprising an interface, a voltage detection unit, an impedance detection unit, a charging detection unit and a central processing unit,
    wherein the interface is configured to allow a cable to be inserted thereinto;
    wherein the voltage detection unit is configured to detect whether there is a voltage input at a power supply (VBUS) pin of the interface, notifying the impedance detection unit when no voltage input is detected, and notifying the charging detection unit when the voltage input is detected;
    wherein the impedance detection unit is configured to, after receiving the notification from the voltage detection unit, detect an impedance between a signal indication (ID) pin of the interface and a ground (GND) pin of the interface;
    wherein the charging detection unit is configured to, after receiving the notification from the voltage detection unit, detect whether there is a short circuit or an open circuit between a data signal positive (DP) pin of the interface and a data signal minus (DM) pin of the interface; and
    wherein the central processing unit is configured to, according to the impedance detected by the impedance detection unit or a detection result from the charging detection unit, determine a type of a cable inserted into the interface, and control, according to the determined type of the cable inserted into the interface, a relevant component in the tablet computer to operate correspondingly,
    wherein the central processing unit is configured to:
    when the impedance detected by the impedance detection unit is 0 ohm, determine that the cable inserted into the interface is an A-type Universal Serial Bus (USB) cable through querying the correspondences between preset impedances and cable types;
    when the impedance detected by the impedance detection unit is larger than or equal to 34.6 kilo-ohms and smaller than or equal to 36.8 kilo-ohms, determine that the cable inserted into the interface is a video cable through querying the correspondences between preset impedances and cable types;
    when the impedance detected by the impedance detection unit is larger than or equal to 64.6 kilo-ohms and smaller than or equal to 71.4 kilo-ohms, determine that the cable inserted into the interface is an audio cable through querying the correspondences between preset impedances and cable types;
    when the impedance detected by the impedance detection unit is larger than or equal to 198 kilo-ohms and smaller than or equal to 202 kilo-ohms, determine that the cable inserted into the interface is a cable for vehicular equipments through querying the correspondences between preset impedances and cable types; and
    when the impedance detected by the impedance detection unit is infinite, determine that the cable inserted into the interface is a B-type USB cable through querying the correspondences between preset impedances and cable types.

2. The device according to claim 1,
    wherein the charging detection unit is configured to, after receiving the notification from the voltage detection unit, detect whether there is a short circuit or an open circuit between the DP pin and the DM pin, transmit a low level signal to the central processing unit when a short circuit is detected, and transmit a high level signal to the central processing unit when an open circuit is detected; and
    wherein the central processing unit is further configured to, when receiving the low level signal, determine that the cable inserted into the interface is an adapter charging cable according to correspondences between signal levels and cable types, and when receiving the high level signal, determine that the cable inserted into the interface is a USB charging cable according to the correspondences between signal levels and cable types.

3. The device according to claim 1, further comprising an interface selection unit, a power supply unit and a charging management unit, wherein the central processing unit comprises a master equipment interface, a video function interface, an audio function interface and a slave equipment interface, and
    wherein the central processing unit is configured to:
    when determining that the cable inserted into the interface is the A-type USB cable, enable the master equipment interface, control the interface selection unit to connect the master equipment interface with an interface of a slave equipment connected to the A-type USB cable, and control the power supply unit to supply power to the slave equipment via the VBUS pin;
    when determining that the cable inserted into the interface is the video cable, enable the video function interface, and control the interface selection unit to connect the video function interface with an interface of an equipment connected to the video cable;
    when determining that the cable inserted into the interface is the audio cable, enable the audio function interface, and control the interface selection unit to connect the audio function interface with an interface of an equipment connected to the audio cable;
    when determining that the cable inserted into the interface is the cable for vehicular equipments, enable the audio function interface or the video function interface, and control the interface selection unit to connect the audio function interface or the video function interface with an interface of an equipment connected to the cable for vehicular equipments;
    when determining that the cable inserted into the interface is the B-type USB cable, enable the slave equipment interface, and control the interface selection unit to connect the slave equipment interface with an interface of a master equipment connected to the B-type USB cable;

when determining that the cable inserted into the interface is the adapter charging cable, and control the charging management unit to charge with a rated adapter charging current; and when determining that the cable inserted into the interface is the USB charging cable, control the charging management unit to charge with a rated USB charging current.

4. An interface expanding method for a tablet computer, the method comprising:

detecting whether there is a voltage input at a power supply (VBUS) pin of the interface, detecting an impedance between a signal indication (ID) pin of the interface and a ground (GND) pin of the interface when no voltage input is detected, and determining, according to the detected impedance, a type of a cable inserted into the interface;

detecting whether there is a short circuit or an open circuit between a data signal positive (DP) pin of the interface and a data signal minus (DM) pin of the interface when the voltage input is detected, and determining, according to the detected result, the type of the cable inserted into the interface; and controlling, according to the determined type of the cable inserted into the interface, a relevant component in the tablet computer to operate correspondingly, wherein the determining, according to the detected impedance, the type of the cable inserted into the interface through querying correspondences between preset impedances and cable types comprises:

when the detected impedance is 0 ohm, determining that the cable inserted into the interface is an A-type Universal Serial Bus (USB) cable through querying the correspondences between preset impedances and cable types;

when the detected impedance is larger than or equal to 34.6 kilo-ohms and smaller than or equal to 36.8 kilo-ohms, determining that the cable inserted into the interface is a video cable through querying the correspondences between preset impedances and cable types;

when the detected impedance is larger than or equal to 64.6 kilo-ohms and smaller than or equal to 71.4 kilo-ohms, determining that the cable inserted into the interface is an audio cable through querying the correspondences between preset impedances and cable types;

when the detected impedance is larger than or equal to 198 kilo-ohms and smaller than or equal to 202 kilo-ohms, determining that the cable inserted into the interface is a cable for vehicular equipments through querying the correspondences between preset impedances and cable types;

when the detected impedance is infinite, determining that the cable inserted into the interface is a B-type USB cable through querying the correspondences between preset impedances and cable types.

5. The method according to claim 4, wherein the detecting whether there is a short circuit or an open circuit between a DP pin of the interface and a DM pin of the interface when the voltage input is detected, and the determining, according to the detected result, the type of the cable inserted into the interface comprise:

detecting whether there is a short circuit or an open circuit between the DP pin and the DM pin, transmitting a low level signal when a short circuit is detected, and transmit a high level signal to the central processing unit when an open circuit is detected; and when the low level signal is received, determining that the cable inserted into the interface is an adapter charging cable according to the correspondences between signal levels and cable types; and when the high level signal is detected, determining that the cable inserted into the interface is a USB charging cable according to the correspondences between signal levels and cable types.

6. The method according to claim 4, wherein the controlling, according to the determined type of the cable inserted into the interface, a relevant component in the tablet computer to operate correspondingly comprises:

when it is determined that the cable inserted into the interface is the A-type USB cable, enabling a master equipment interface, controlling an interface selection unit to connect the master equipment interface with an interface of a slave equipment connected to the A-type USB cable, and controlling a power supply unit to supply power to the slave equipment via the VBUS pin;

when it is determined that the cable inserted into the interface is the video cable, enabling a video function interface, and controlling the interface selection unit to connect the video function interface with an interface of an equipment connected to the video cable;

when it is determined that the cable inserted into the interface is the audio cable, enabling an audio function interface, and controlling the interface selection unit to connect the audio function interface with an interface of an equipment connected to the audio cable;

when it is determined that the cable inserted into the interface is the cable for vehicular equipments, enabling the audio function interface or the video function interface, and controlling the interface selection unit to connect the audio function interface or the video function interface with an interface of an equipment connected to the cable for vehicular equipments;

when it is determined that the cable inserted into the interface is the B-type USB cable, enabling a slave equipment interface, and controlling the interface selection unit to connect the slave equipment interface with an interface of a master equipment connected to the B-type USB cable;

when it is determined that the cable inserted into the interface is the adapter charging cable, controlling a charging management unit to charge with a rated adapter charging current; and when it is determined that the cable inserted into the interface is the USB charging cable, controlling the charging management unit to charge with a rated USB charging current.

7. The device according to claim 2, further comprising an interface selection unit, a power supply unit and a charging management unit, wherein the central processing unit comprises a master equipment interface, a video function interface, an audio function interface and a slave equipment interface, and wherein the central processing unit is configured to:

when determining that the cable inserted into the interface is the A-type USB cable, enable the master equipment interface, control the interface selection unit to connect the master equipment interface with an interface of a slave equipment connected to the A-type USB cable, and control the power supply unit to supply power to the slave equipment via the VBUS pin;

when determining that the cable inserted into the interface is the video cable, enable the video function interface, and control the interface selection unit to connect the video function interface with an interface of an equipment connected to the video cable;

when determining that the cable inserted into the interface is the audio cable, enable the audio function interface, and control the interface selection unit to connect the audio function interface with an interface of an equipment connected to the audio cable;

when determining that the cable inserted into the interface is the cable for vehicular equipments, enable the audio function interface or the video function interface, and control the interface selection unit to connect the audio function interface or the video function interface with an interface of an equipment connected to the cable for vehicular equipments;

when determining that the cable inserted into the interface is the B-type USB cable, enable the slave equipment interface, and control the interface selection unit to connect the slave equipment interface with an interface of a master equipment connected to the B-type USB cable;

when determining that the cable inserted into the interface is the adapter charging cable, and control the charging management unit to charge with a rated adapter charging current; and when determining that the cable inserted into the interface is the USB charging cable, control the charging management unit to charge with a rated USB charging current.

8. The method according to claim 5, wherein the controlling, according to the determined type of the cable inserted into the interface, a relevant component in the tablet computer to operate correspondingly comprises:

when it is determined that the cable inserted into the interface is the A-type USB cable, enabling a master equipment interface, controlling an interface selection unit to connect the master equipment interface with an interface of a slave equipment connected to the A-type USB cable, and controlling a power supply unit to supply power to the slave equipment via the VBUS pin;

when it is determined that the cable inserted into the interface is the video cable, enabling a video function interface, and controlling the interface selection unit to connect the video function interface with an interface of an equipment connected to the video cable;

when it is determined that the cable inserted into the interface is the audio cable, enabling an audio function interface, and controlling the interface selection unit to connect the audio function interface with an interface of an equipment connected to the audio cable;

when it is determined that the cable inserted into the interface is the cable for vehicular equipments, enabling the audio function interface or the video function interface, and controlling the interface selection unit to connect the audio function interface or the video function interface with an interface of an equipment connected to the cable for vehicular equipments;

when it is determined that the cable inserted into the interface is the B-type USB cable, enabling a slave equipment interface, and controlling the interface selection unit to connect the slave equipment interface with an interface of a master equipment connected to the B-type USB cable;

when it is determined that the cable inserted into the interface is the adapter charging cable, controlling a charging management unit to charge with a rated adapter charging current; and when it is determined that the cable inserted into the interface is the USB charging cable, controlling the charging management unit to charge with a rated USB charging current.

\* \* \* \* \*